UNITED STATES PATENT OFFICE.

OSCAR BALLY, OF MANNHEIM, GERMANY, ASSIGNOR TO THE BADISCHE ANILIN AND SODA FABRIK, OF LUDWIGSHAFEN, GERMANY.

YELLOW-RED DYE AND PROCESS OF MAKING SAME.

SPECIFICATION forming part of Letters Patent No. 659,566, dated October 9, 1900.

Application filed June 24, 1899. Serial No. 721,762. (Specimens.)

*To all whom it may concern:*

Be it known that I, OSCAR BALLY, doctor of philosophy, a citizen of the Swiss Republic, residing at Mannheim, in the Grand Duchy of Baden and Empire of Germany, have invented new and useful Improvements in the Manufacture of Yellow-Red Coloring-Matter for Wool, (for which applications for patents have been filed in Germany, dated December 9, 1898, No. B. 23,887; in England, dated April 11, 1899, No. 7,591, and in France, dated May 4, 1899, No. 276,452,) of which the following is a specification.

It is known that if 1.5-di-ortho-nitro-anthraquinone be boiled with anilin a product is obtained which crystallizes in deep-red needles and dissolves in hot alcohol, giving purple solutions. This was first described by Böttger and Petersen in 1873. (See *Berichte of the German Chemical Society*, Vol. 6, p. 16.) Ten years later, in 1883, the body was more accurately described by Römer. (See *Berichte of the German Chemical Society*, Vol. 16, p. 363.) This body is intensely colored, it dissolves in such solvents as glacial acetic acid, benzene, and the like, yielding intensely-red solutions; but it possesses no affinity for textile fibers and cannot be regarded as a dyestuff in a practical sense, and no means of converting it into useful products has been described. Analogous bodies can be obtained if the di-nitro-anthraquinone be treated with other aromatic amins instead of with anilin, and the bodies so obtained I term "di-alphyl-diamido-anthraquinones." In United States Letters Patent Nos. 631,605 and 631,606, of August 22, 1899, I have already described the utilization of these bodies for the production of halogen derivatives and of coloring-matters of the anthracene series.

My present invention relates to the manufacture of wool coloring-matters of the said di-alphyl-diamido-anthraquinone by sulfonation.

Different results are obtained, according to whether the sulfonation be conducted energetically or moderately. Upon moderate sulfonation with concentrated sulfuric acid at a temperature not exceeding 100° coloring-matter is obtained which is readily soluble in hot water, but can be readily precipitated from its solution by common salt. The shades obtained upon wool with coloring-matter obtained in this way are violet-red in color; but if the di-alphyl-diamido-anthraquinone be energetically sulfonated—say, with fuming sulfuric acid containing twenty per cent. free anhydride—a coloring-matter is obtained which is soluble in hot or cold water and cannot readily be precipitated from its solution with common salt or potassium chlorid. Such coloring-matter dyes wool, yielding yellowish shades of red.

In the present application for Letters Patent I do not claim the violet-red coloring-matters referred to, for these coloring-matters constitute the subject-matter of another application, Serial No. 721,761, of even date herewith; but I desire to claim the yellow-red coloring-matters referred to generically, and specifically that coloring-matter which can be obtained by the energetic sulfonation of di-anilido-anthraquinone.

The following example will serve to illustrate the manner in which my invention can be carried into practical effect: Add about ten (10) parts of 1.5-di-anilido-anthraquinone to one hundred (100) parts of fuming sulfuric acid, (containing about twenty per cent. $SO_3$.) Warm the mixture to a temperature of 30° to 35° centigrade and stir at this temperature until a test portion is completely soluble in cold water. Pour the melt into ice-water and neutralize the solution exactly with milk of lime and filter from the gypsum formed. To the filtrate add the requisite quantity of sodium carbonate and filter off the precipitated chalk. Then isolate the sodium salt of the sulfoacid contained in the filtrate by evaporating to dryness.

My new coloring-matters are dark-colored powders, easily soluble in water, giving yellow-red solutions, which on the addition of caustic soda becomes cherry-red, and they are practically insoluble in alcohol and anilin. In concentrated sulfuric acid the specific coloring-matter obtained from di-anilido-anthraquinone dissolves, giving a red color.

What I claim is—

1. The yellow-red coloring-matter which can be obtained by treating di-alphyl-diamido-anthraquinone with fuming sulfuric acid, which is easily soluble in water, giving yellow-red solutions which on the addition of caustic soda become cherry-red and which is practically insoluble in alcohol and anilin, substantially as described.

2. The new yellow-red coloring-matter which can be obtained from 1.5-di-anilido-anthraquinone by treatment with fuming sulfuric acid, which is easily soluble in water giving a yellow-red solution which becomes bluer in shade on the addition of caustic soda and which is practically insoluble in alcohol and anilin and dissolves in concentrated sulfuric acid giving a red color, substantially as described.

In testimony whereof I have hereunto set my hand in the presence of two subscribing witnesses.

OSCAR BALLY.

Witnesses:
GUSTAV L. LUTTENBERGER,
GEORG KOERNER.